United States Patent [19]

Large

[11] Patent Number: 5,555,458
[45] Date of Patent: Sep. 10, 1996

[54] PASSENGER SAFETY STATUS INDICATOR

[76] Inventor: Darrell Large, 583 Kumukahi Pl., Honolulu, Hi. 96825

[21] Appl. No.: 338,389

[22] Filed: Nov. 14, 1994

[51] Int. Cl.⁶ .................................................. G08B 21/00
[52] U.S. Cl. ..................... 340/945; 340/825.08; 348/8; 455/5.1
[58] Field of Search .................. 340/425.5, 945, 340/457.1, 311.1, 332, 286.06, 286.07, 825.08; 348/8, 117, 836, 837; 370/95.2; 455/5.1, 6.3

[56] References Cited

U.S. PATENT DOCUMENTS

| | | | |
|---|---|---|---|
| 2,910,680 | 10/1959 | McLain | 340/286.07 |
| 3,875,556 | 4/1975 | Beaird | 340/457.1 |
| 4,237,344 | 12/1980 | Moore | 340/286.07 |
| 4,584,603 | 4/1986 | Harrison | 348/8 |
| 4,835,604 | 5/1989 | Kondo et al. | 348/8 |
| 4,896,209 | 1/1990 | Matsuzaki et al. | 348/8 |
| 4,958,381 | 9/1990 | Toyoshima | 370/95.2 |
| 5,072,340 | 12/1991 | Jones | 340/475 |

Primary Examiner—Brent A. Swarthout
Attorney, Agent, or Firm—Michael I. Kroll

[57] ABSTRACT

A passenger safety status indicator for vehicles comprises monitor display panel at or near the supervisory monitor's seat on an airliner. The display panel is capable of displaying the status of a plurality of safety procedures required to be followed by each passenger occupying a seat. Commonly these items are; (1) seat back in the full forward and locked position, (2) seat belt tight and fastened, and (3) serving tray in the upright and locked position. The panel has a 3 bulb display light for each seat position on the airplane. A display globe for each seat position has at least three separate colored lenses for displaying the status of each one of the required safety procedures. Each passenger station or small group of such positions is provided with a smaller display device for signaling the individual passengers as to the status of their individual safety procedures.

2 Claims, 3 Drawing Sheets

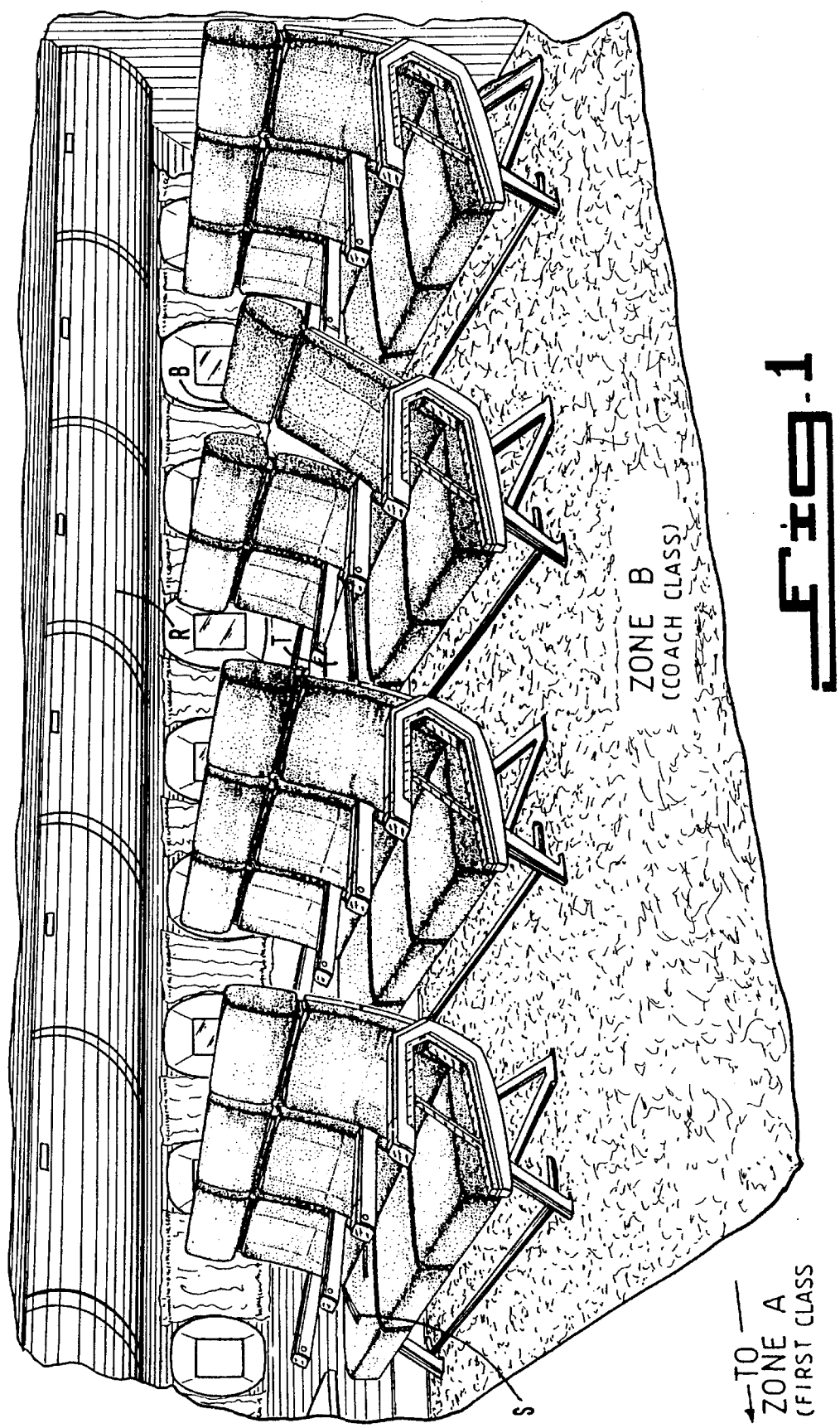

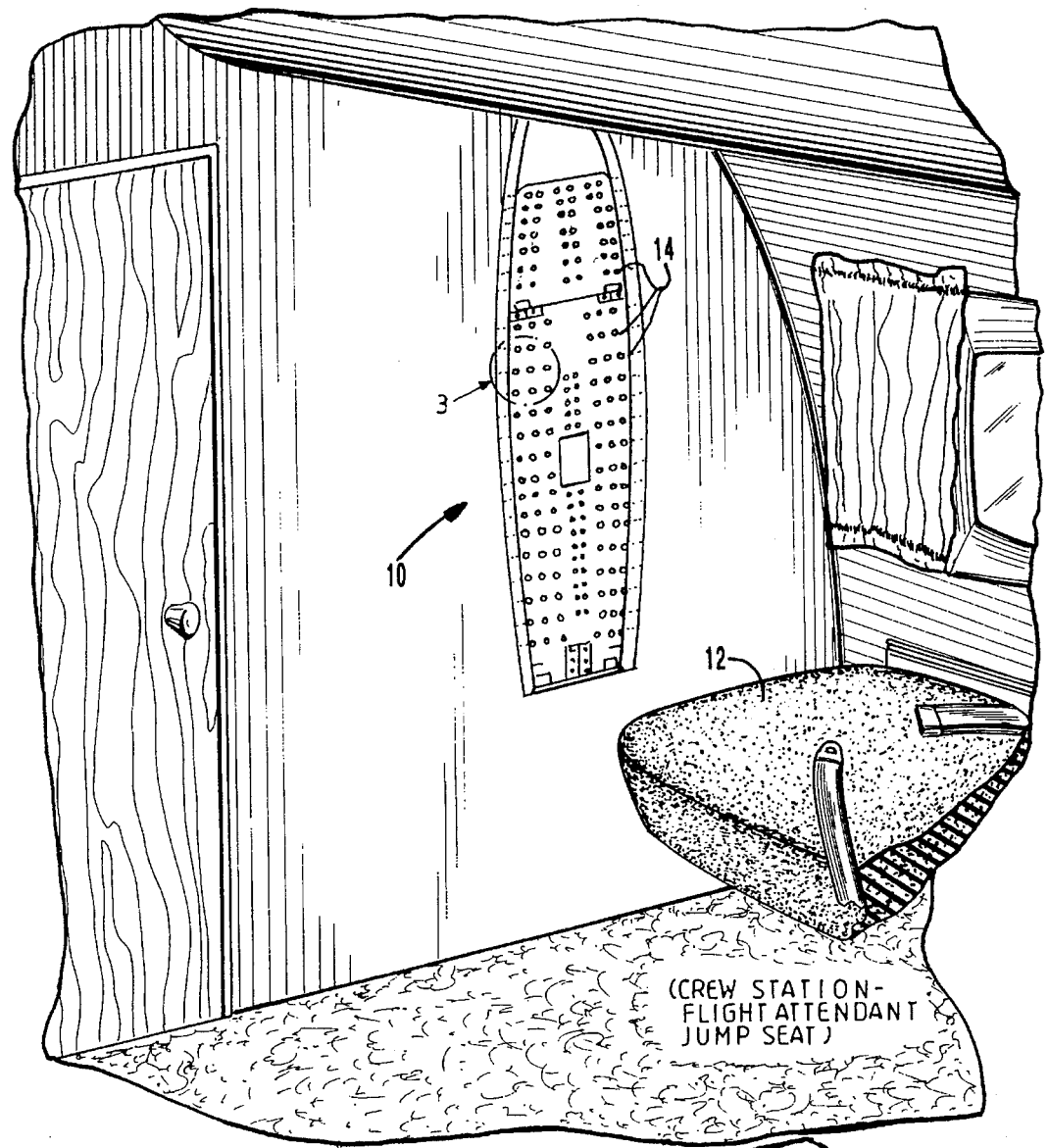
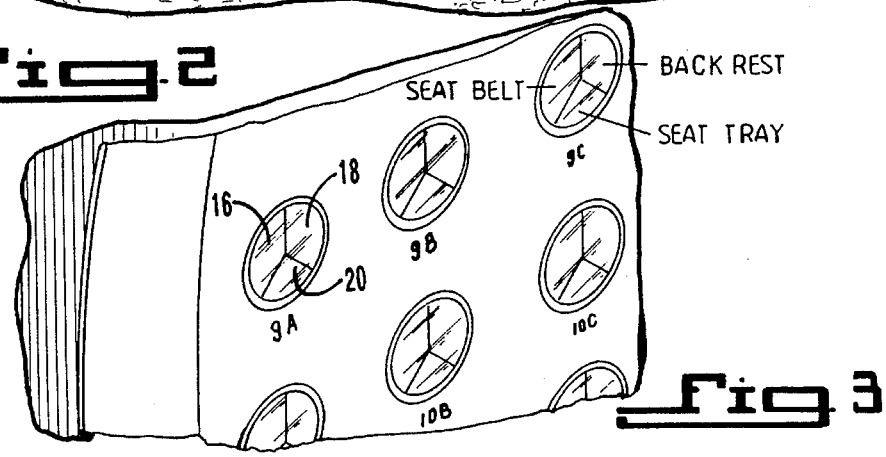

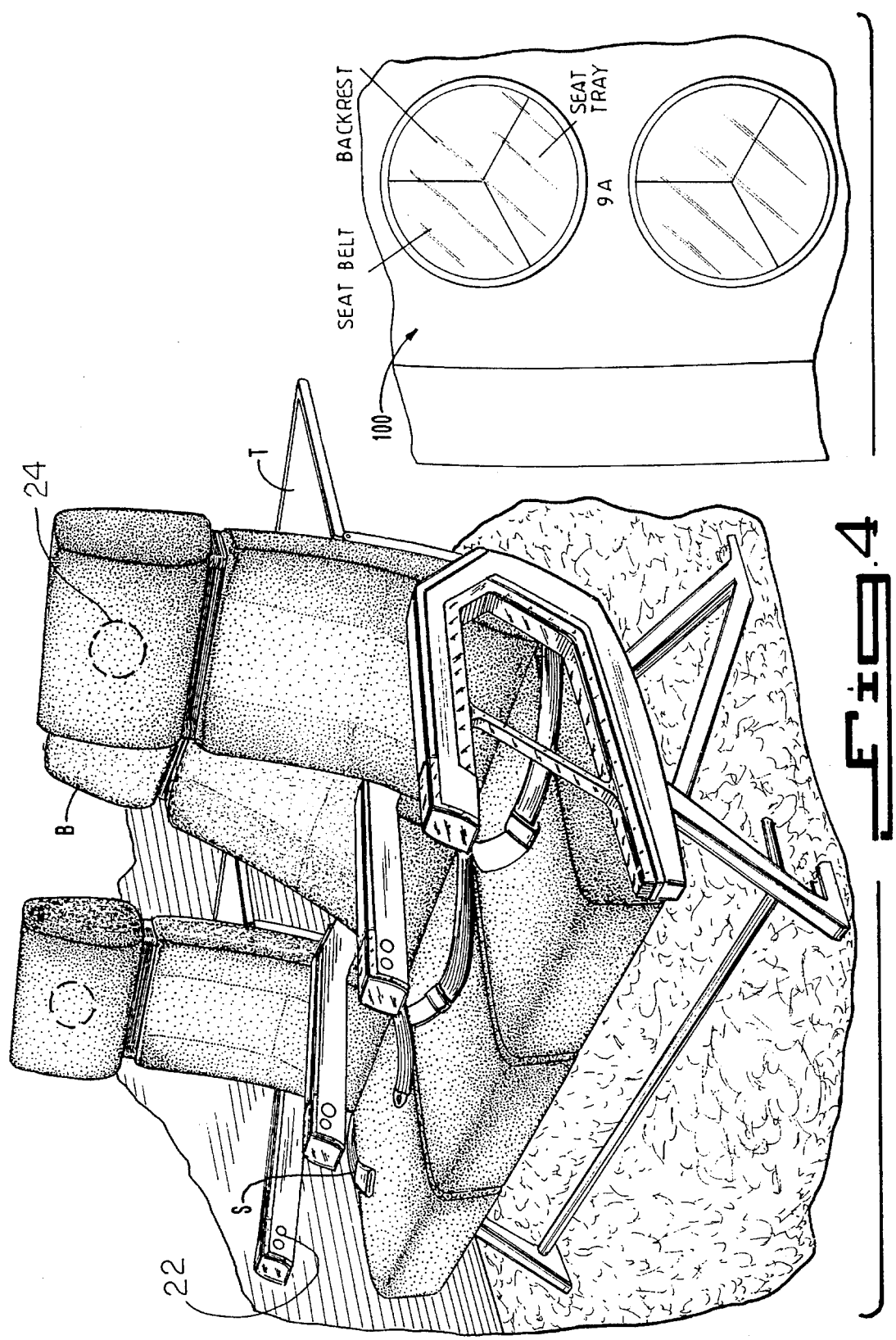

PASSENGER SAFETY STATUS INDICATOR

BACKGROUND OF THE INVENTION

1. Field of the Invention

The present invention relates to a Passenger Safety Status Indicator (PSSI) and Associated Intercommunications and Electronic Sensing Devices for vehicles with an operator or crew and more than six passengers. More specifically as an example, it would relate to warning light indicator and related devices for use on passenger airlines which allows a Flight Attendant or pilot to instantly ascertain the status of safety items controllable by the passengers and to communicate directly with individual passengers without leaving their crew seat. For example, the status of the seat belt fastened, the seat back tray up, and the seat back up for all passengers on same aircraft or those passengers in each section or zone on large aircraft is displayed at a single location for instant verification before takeoff and landing as well as inflight whenever the seatbelt sign is activated. More generally, the invention allows for full two-way communication between the passenger and crew with a signal being sent from the crew person to the passenger (or vice versa) if a problem is present and an automatic signal being returned to the crew person upon compliance. This may also take the form of two-way voice communication or other audio and/or lighted signal devices. For example, a voice channel between each passenger and the flight attendant can be activated by either party and responded to upon receipt of a call signal by the other. This is to be accomplished by one of several options, for example a simple call button plus small speaker/microphone in the passenger headrest while the flight attendant uses a call button mounted in the PSSI and a simple crew member headset and microphone. This complete aircraft system is referred to hereafter as the "Passenger Safety Status Indicator and Intercom (PSSIIC) System."

It is anticipated the invention will find immediate and widespread advantages to the field of public transportation. Airliners, trains, and buses are all potential users of the invention. The invention could also find use as a general purpose signal indicator for monitoring large groups of people or machinery from a single remote location. For example, in a large office of workers signal indicators could be provided at each persons work station to allow a single receptionist to monitor the presence of individual workers. Another example would be to monitor the status of large banks of machinery in an automated manufacturing setting. The primary field to benefit immediately from the unique features of the instant invention is the transportation industry. However, it may be seen that the fields of office management and manufacturing may also derive substantial benefit.

As such the potential fields of use are myriad. Those skillful in the electrical and mechanical arts will find many other potential fields of use for this device. It is to be understood from the outset that the scope of this invention is not limited to these fields or to the specific examples of potential uses presented hereinafter.

2. Description of the Prior Art

Prior signaling devices have been developed to signify the status of passenger safety equipment. The most notable example is the annoying but important seat belt warning present in modern passenger car vehicles. These normally operate some sort of light, buzzer, or bell to serve as a warning that the seat belt has not been properly fastened.

The present method of monitoring airline passengers requires a flight attendant to walk up and down the aisles to manually check each individual passenger seat for safety feature compliance. This method is archaic, laborious, time consuming and most importantly dangerous to both flight attendants and passengers. In addition the chance that an unfastened seat belt will go undetected is quite large as the passengers often do not present easy visual access to the flight attendant. A further safety hazard exists when flight attendants have to walk down the aisle in response to a Passenger Call Button signal and then make a second trip to deliver drinks, etc. The PSSIIC System will save millions of dollars annually in stress, lost time, injuries, fatalities and employee satisfaction.

A search at the United States Patent and Trademark Office revealed the following pertinent prior art references. No prior art was discovered that provides automated monitoring of individual passenger safety precautions on an airliner. As will be seen, the simplicity and effectiveness of my invention is not rivaled in the prior art.

U.S. Pat. No. 3,840,849, issued to Thomas E. Lohr on Oct. 8, 1974, shows a vehicle seat belt warning system. The system comprises, in combination, a buckle with slot for receiving a tongue in locking engagement, which tongue, upon insertion into the buckle actuates a single pole, two-position electric switch within the buckle from a first closed circuit position to an open circuit position and from a second open position momentarily to a closed circuit position. The switch is in a circuit which includes three flexible connectors preferably imbedded in the belt or flexible band attached to the buckle, at least one additional switch, at least one electrically operated signal device, and a source of electrical energy, whereby, when an additional switch such as a vehicle's ignition switch is turned on and the seat belt buckle is not in locked engagement with the tongue, this unlocked condition of the seat belt will be indicated by the warning device. The patent does not teach or suggest a multiple indication of more than one safety precaution at each passenger position.

Insofar as the patent shows the circuit arrangements for electrical power supplies and multiple seat belt indicators, U.S. Pat. No. 3,840,849 is hereby incorporated by reference into this application.

By contrast, the device of the instant invention teaches a console display for multiple safety precautions observed at multiple passenger locations. There is provision for signaling or communicating with the individual passengers and the crew person in charge of monitoring compliance with the safety precautions. The intercom feature is also used to better serve passenger needs while minimizing flight attendant time walking up and down aisles and the associated danger involved.

U.S. Pat. No. 3,886,516, issued to Masaru Itoh et al. on May 27, 1975, shows a seat belt operation detector. The patented device includes a first detector means for actuating at the time of sitting on a seat and a second detector means for actuating at the time of connecting of a seat belt. A flip-flop circuit responds to signals of the first and second detector means such that a normal connecting of the seat belt can be detected only when the signal of the first detector is applied to the flip-flop. An alarm is operated or an engine is prevented from being started at abnormal or improper seat belt connecting conditions since the two detector signals will be received in different order or only one of the signals will be received when there is not seat belt use. The device does not show a multiple safety alert at multiple passenger locations.

By contrast, the device of the instant invention teaches a console display for multiple safety precautions observed at multiple passenger locations. There is provision for signaling both the individual passengers and the crew person in charge of monitoring compliance with the safety precautions.

U.S. Pat. No. 3,898,473, issued to Atsushi Ueda et al. on Aug. 5, 1975, shows a sensing system for sensing the state of wearing of a seat belt. The patented system for a motor vehicle comprises a seat switch adapted to be closed when a person sits on a seat, a belt switch adapted to be closed when the person wears a seat belt, and a FLIP-FLOP circuit including two NAND gates having two inputs connected to both switches respectively. Another NAND gate receives inputs from both the FLIP-FLOP circuit and the belt switch and responds to the closure of the seat switch followed by the closure of the belt switch to provide an output to permit the associated engine start. The device does not show a multiple safety alert at multiple passenger locations. No provision is made for alerting individual passengers that appropriate safety precautions have not been taken. The primary novelty of the device is in providing the reduction of false signals caused by a passenger or driver bouncing on the seat so as to momentarily open a seat occupancy sensing switch.

The standard digital logic circuitry utilized by this patent could also be used in the instant invention and, insofar as appropriate, U.S. Pat. No. 3,898,473 is hereby incorporated by reference.

By contrast, the device of the instant invention teaches a console display for multiple safety precautions observed at multiple passenger locations. There is provision for signaling both the individual passengers and the crew person in charge of monitoring compliance with the safety precautions.

U.S. Pat. No. 4,667,336, issued to Robert H. Best on May 19, 1987, shows a system for automatic detection of seat belt usage. The patented method and apparatus for encouraging driver's seat belt usage includes a system for detecting and recording each time a seat belt is used. Depending on the level of seat belt usage the driver earns discounts on car insurance premiums. The patented device does not show any type of warning or monitoring activity associated with belt usage. The device does not show a multiple safety alert at multiple passenger locations. No provision is made for alerting individual passengers that appropriate safety precautions have not been taken.

By contrast, the device of the instant invention teaches a console display for monitoring multiple safety precautions observed at multiple passenger locations. There is also provision for signaling both the individual passengers and the crew person in charge of monitoring compliance with the safety precautions.

It will be noted that all the prior art devices serve for monitoring a single passenger safety requirement (fastening a seat belt) in the relatively small environment of a motor vehicle. The apparatus of this invention is suitable for use on a much larger scale and for a much more important function. The multiple passenger monitoring and intercommunications (PSSIIC) of this invention is intended primarily for monitoring and controlling the use of several safety precautions required of all passengers aboard a modern passenger airline, however it is also applicable to land and water based vehicles as well. Hundreds of seats may be involved and several items of safety precaution required for each seat or a more simple version may only involve instant verification of all School Bus Passenger Seat Belt usage.

None of the above inventions and patents, taken either singly or in combination, is seen to describe the instant invention as claimed.

SUMMARY OF THE INVENTION

Briefly, using its application to aircraft as an example only, the invention comprises monitor display panel (PSSIIC) at or near the supervisory monitor's (Flight Attendant) seat on an aircraft. The PSSIIC is capable of displaying the status of at least three safety procedures required to be followed by each passenger occupying a seat. Commonly these items are; (1) seat back in the full forward and locked position, (2) seat belt tight and fastened, and (3) serving tray in the upright and locked position (can be accomplished for unoccupied seats by ground crew prior to take off). The PSSIIC panel has a 3 bulb display light and call button for each seat position on the airplane. A display globe for each seat position has at least three separate colored lenses for displaying the status of each one of the required safety procedures and may also house the call button. An alternative is for the Flight Attendant Station to use a separate panel of small display devices to provide individual passengers with the status of their individual safety features thus negating the need to use the voice intercom for this purpose.

The present invention holds many advantages for airlines which accommodate multitudes of passengers. Of primary importance is the improved safety of the passengers since the PSSIIC system allows for more efficient enforcement of safety regulations since compliance is not left up to human observation. For example, the PSSIIC system will detect an unfastened seatbelt which may have otherwise gone unnoticed by the flight attendant. Secondly, crew fatigue, stress and absenteeism will be substantially reduced since the risk of injury is minimized by the reduced trips up and down the aisles checking on safety compliance through observation. In turn, injury and potential fatalities, carrier liability, workman's compensation claims, and temporary disability will be substantially reduced.

Accordingly, it is a principal object of the invention to provide a new and improved passenger safety status indicator which overcomes the disadvantages of the prior art in a simple, relatively inexpensive and effective manner.

It is a major object of this invention to provide a crew member(s) with an instant visual display of the status of passenger safety devices without leaving the Flight Attendant Station or physically inspecting each passenger seat for compliance. This PSSIIC allows this verification and or communication between flight attendant and individual passengers while both are comfortably seated in their respective seats with their seat belts safely in place.

It is another object of the invention to provide a means for the crew member to communicate instructions to or receive inquiries from individual passengers without having to unbuckle their own seat belt and leave their station.

It is another object of the invention to provide a passenger signal means in proximity to existing passenger call buttons on a public utility vehicle or, in the absence of an existing passenger call button, to provide such a call button as an integral part of the PSSIIC panel of this invention.

It is another object of the invention to provide a passenger safety status indicator which may be built into new vehicles or retrofit onto existing vehicles.

Finally, it is a general object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a partial environmental perspective view of the interior of an airliner where the present invention might be applied.

FIG. 2 is a partial perspective view of a flight attendant seat on the same airliner showing the PSSIIC panel of the invention within easy view of a securely seated flight attendant. This panel is depicted as being large for illustration purposes only as in fact each panel will be configured to fit the space available and normally no more than 12×18 inches in size.

FIG. 3 is a close up view of the section of the PSSIIC panel circled and labeled as 3 in FIG. 2 which particularly shows the triple light display button for each individual seat position. Again the call button may be built into this feature or designed as a separate button either on the PSSIIC panel or on a separate dedicated panel.

FIG. 4 is a partial perspective view of an individual bank of seats showing one form of passenger signaling means for mounting within easy viewing distance of the individual passengers. The optional small (approx. 3 inch) speaker/microphone unit in the passenger headrest is also illustrated.

DETAILED DESCRIPTION OF THE PREFERRED EMBODIMENTS

The overall invention comprises the following main parts; (1) the master control console or PSSIIC panel 10 of FIGS. 2 and 3; (2) the individual passenger signal panels and/or built in speaker/microphone as the ones illustrated in FIG. 4; and (3) the conventional sensor switches, interconnecting wiring, and electrical power supply which are shown and described in U.S. Pat. No. 3,840,849, which has been incorporated by reference.

The preferred environment of the invention is pictured in FIG. 1 illustrating the interior of a passenger airliner. It is to be understood that passengers normally occupy most if not all of the illustrated seats but the passengers have been omitted from the Figures for clarity of illustrating the invention. FIG. 1 serves to illustrate three commonly violated safety precautions that must be observed on commercial airliners. Seat belt S is seen to be unfastened near the front portion of the figure. Tray table T is seen to be in the down position in the third row of seats in the figure. Seat back B, also in the third row, is seen to be reclined out of the full upright position. Also shown are overhead luggage racks R above the rows of seats. It is to be understood that, although the preferred embodiment is described with respect to the multiple passenger seats in an airliner, the invention is easily adapted for use on a bus, van, train, or boat where passenger use of seat belts and other safety features need verification.

Turning now to FIG. 2, master control console or PSSIIC panel 10 can be seen located directly in front of flight attendant seat 12. Panel 10 (shown significantly larger than actual size for illustration only) comprises a multitude of identical multiple warning signal lamps 14 arranged in a pattern corresponding to a map of the seat placements aboard smaller aircraft or a given zone in larger models. There is one lamp 14 for each seat aboard the aircraft (or zone in larger aircraft) and each lamp is in a display area on the panel which is mapped in a one-to-one correspondence with a seat area on the aircraft. The exploded view of FIG. 3 provides a closeup of each individual warning lamp where it can be seen that each lamp is composed of a group of smaller lamps. The smaller portions are shown here as three equal pie shaped portions 16, 18, and 20 arranged around each circular lamp. Area 16 of each lamp would be lit when the seat belt for that seat was not fastened. Area 18 of each lamp would be lit when the back rest for that seat was not in the full upright position. Area 20 of each lamp would be lit when the seat tray for that seat was not upright and locked. The lamps would be lit by conventional circuitry by conventional switch sensors as described in U.S. Pat. No. 3,840,849, which has been incorporated by reference. In particular FIG. 7 of that patent illustrates a circuit for lighting individual warning lamps from a plurality of passenger positions.

It is to be understood that many other lamp profiles are possible and well within the skill of the ordinary artisan. The main feature to be emphasized here is that each individual seat area is mapped on to the main PSSIIC console with a plural array of indicators with one indicator for each safety function served by the system. It is possible to have more than three indicator lamps for each passenger seat position. For example, an additional warning lamp position could be added for the overhead luggage racks R shown in FIG. 1. Further, an additional lamp (or button) could be added for a flight attendant call button 22 as shown in FIG. 4 enabling a passenger to signal the flight attendant by causing an indicator to become activated upon the main PSSIIC console. Other variations are contemplated that might include use photoelectric sensors to sense improperly stowed underseat luggage and other safety hazards.

An important feature of this invention is the provision of individual warning lamps and/or speaker/microphone built into the headrest of each seat as illustrated in FIG. 4 or other location if more feasible allowing flight attendants to communicate with individual passengers when necessary rather than walking through the aisle while a flight is in progress. These individual lamps include similar multiple warning arrays and are identical to the individual lamps 14 on the PSSIIC panel. The lamps may be circular as depicted in this application or a series of bar lights and are used to signal the passengers in that area about possible safety violations by themselves or their neighbors. The lamps are shown in FIG. 4 as separated from the seat area themselves, but it is to be understood that they may actually be mounted at any convenient position easily visible by the passengers. One possible position would be on the back of the headrest portion of the seat in front of the passenger. Another possible position would be on the armrest next to the passenger.

The operation of the invention will now be discussed in reference to FIG. 4 which illustrates three common safety violations without the use of the optional voice intercom system. The window seat (left side of the figure) has an unfastened seat belt, the center seat has its seat back reclined, and the aisle seat has the tray table to its rear in the down position. If the illustrated seats are considered seats 9A, 9B, and 9C, respectively, the seat directly behind seat 9C can be considered seat 10C. In this circumstance, the master control panel will have the seat belt section 16 of lamp 9A lit, the seat back section 18 of lamp 9B lit, and the seat tray section 20 of seat 10C lit. The individual lamps, visible by the passengers in seats 9A, 9B, and 10C will also be lit. It will be noted that neighboring passengers will also be able to observe violations. Thus, for example, the passenger in seat 9A might inform the passenger in seat 9B that his seat back needs adjusting. Similarly, the passenger in seat 9B might inform the passenger in seat 9A that his seat belt needs fastening. If after a reasonable period of time the violations are not taken care of by the passengers and their neighbors the attendant might initiate a warning to those remaining in noncompliance over a secondary signaling means. This might be done by pressing a switch for an individual seat that would cause the indicator light to begin flashing so as to gain attention. Perhaps a seat tray is found to be lowered in an unoccupied seat even though ground crews had all unoccupied seat belts fastened, seats in full upright position and trays secured prior to take off. In this case a neighboring passenger could save the flight attendant a trip by correcting the fault at this time. If an occupied seat passenger should fail to respond for whatever reason, the flight attendant could call out the offending seat by row or number over the existing public address system or speak directly to the passenger via the PSSIIC if so equipped with that option. If the seat is unoccupied the nearby passengers would again have a chance to correct the problem. If the seat is occupied, the chagrined passenger will perhaps never again commit a safety violation aboard an airliner! Only after the PSSIIC system or public announcement fails will the flight attendant be forced to actually travel to the offending seat to check out the problem. Contrast this with the present system where the flight attendant is required to visit each and every seat personally at each and every takeoff, landing, and during in flight situations calling for seat belts to be fastened, etc. A two-way intercom will facilitate the attendant to respond to a call button without leaving the attendant's seat. The saving in time, increased efficiency, and most importantly increased safety of both passengers and crew is apparent.

Another option is to permit the crew member to selectively display the safety status of any safety device at one time.

A list of reference numerals for the first embodiment of the present invention follows:

10 master control console panel
12 flight attendant seat
14 multiple function indicator lamps
16 seat belt section of indicator
18 back rest section of indicator
20 seat tray section of indicator
22 flight attendant call button
24 built in speaker/microphone
S seat belt
B seat back
T seat tray
R overhead luggage rack
100 individual warning console It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions. For example, the artisan could easily see how to superimpose an audio frequency telephone signal on the interconnecting wires so as to provide a full two-way voice communication between any single passenger and the flight attendant. Replacing the signal wires with fiber optic strands is also a viable alternative. Of course it is also contemplated that the layout of the panels is subject to wide variations in size, shape and design configuration. For example, the "seat-map" type panel could be replaced with a digital readout panel which could sequentially poll individual seat positions and signal the positions of those with violations. The environment of the invention is not intended to be restricted to airliners or even to vehicles.

It is to be understood that the present invention is not limited to the sole embodiment described above, but encompasses any and all embodiments within the scope of the following claims:

I claim:

1. A safety status system for displaying the status of multiple safety procedures carried out by the passengers in a passenger aircraft having a flight attendant in which each passenger is seated in an assigned seat having a seat belt, a tray movable between stowed and deployed positions, and a seat back rest movable between full upright and reclining positions, comprising:

a master passenger safety status indicator and intercom display console located for viewing at a flight attendant station, said console comprising discrete light means arranged in an array corresponding to the location of passenger seats in said aircraft, so that said array is mapped in one-to-one correspondence with each of said passenger seats and each light means represents a single individual passenger position;

sensing means for sensing the fastened status of each seat belt, the position of each said tray, and position of said seat back rest for each passenger seat for compliance with safety instructions issued by said flight attendant by each passenger and generating corresponding safety status signals;

each said light means comprising a light display divided into segments, each segment indicating continuously the fastened status of the seat belt, the position of said tray, and the position of said seat back rest for each passenger seat on said aircraft; and means for duplicating the display for each corresponding seat in said light means on the back of the head rest facing each said passenger seat so that each passenger can be notified of failure to comply with a safety instruction and neighboring passengers can monitor the safety compliance of each passenger.

2. The safety system of claim 1 having loudspeaker means mounted in the head rest for each passenger seat to permit the flight attendant to notify a particular passenger of non-compliance with safety instructions.

* * * * *